United States Patent
Claireaux et al.

(10) Patent No.: US 10,787,383 B2
(45) Date of Patent: Sep. 29, 2020

(54) MINERAL FIBRES

(71) Applicant: SAINT-GOBAIN ISOVER, Courbevoie (FR)

(72) Inventors: Corinne Claireaux, Paris (FR); Jean-Luc Bernard, Breuil le Vert (FR)

(73) Assignee: SAINT-GOBAIN ISOVER, Courbevoie (FR)

(*) Notice: Subject to any disclaimer, the term of this patent is extended or adjusted under 35 U.S.C. 154(b) by 0 days.

(21) Appl. No.: 16/633,668

(22) PCT Filed: Jul. 24, 2018

(86) PCT No.: PCT/FR2018/051890
§ 371 (c)(1),
(2) Date: Jan. 24, 2020

(87) PCT Pub. No.: WO2019/020925
PCT Pub. Date: Jan. 31, 2019

(65) Prior Publication Data
US 2020/0181005 A1    Jun. 11, 2020

(30) Foreign Application Priority Data
Jul. 25, 2017 (FR) ..................... 17 57027

(51) Int. Cl.
| C03C 13/00 | (2006.01) |
| C03C 3/089 | (2006.01) |
| C03C 13/06 | (2006.01) |
| C03C 4/00  | (2006.01) |
| F16L 59/02 | (2006.01) |
| C03B 37/06 | (2006.01) |

(52) U.S. Cl.
CPC .............. *C03C 13/06* (2013.01); *C03B 37/06* (2013.01); *C03C 3/089* (2013.01); *C03C 4/0014* (2013.01); *F16L 59/028* (2013.01); *C03C 2204/00* (2013.01); *C03C 2213/02* (2013.01)

(58) Field of Classification Search
CPC ......... C03C 3/089; C03C 3/091; C03C 13/00; C03C 13/06
See application file for complete search history.

(56) References Cited

U.S. PATENT DOCUMENTS 5,691,255 A * 11/1997 Jensen .................... C03C 13/00
501/36
2002/0032116 A1    3/2002 Jubb et al.

FOREIGN PATENT DOCUMENTS

| CN | 1544370 A | 11/2004 | |
| WO | WO-9531410 A1 * | 11/1995 | ............. C03C 13/00 |

OTHER PUBLICATIONS

International Search Report dated Jan. 3, 2019 in PCT/FR2018/051890 filed on Jul. 24, 2018, 2 pages.
International Search Report dated Jan. 3, 2019 in PCT/FR2018/051890 filed on Jul. 24, 2018 (5 pages).
Written Opinion dated Jan. 3, 2019 in PCT/FR2018/051890 filed Jul. 24, 2018 (12 pages).

* cited by examiner

*Primary Examiner* — Elizabeth A. Bolden
(74) *Attorney, Agent, or Firm* — Oblon, McClelland, Maier & Neustadt, L.L.P.

(57) ABSTRACT

Mineral fibers that exhibit a chemical composition comprising the following constituents, as percentages by weight:

| $SiO_2$ | 57.0 to 60.0%, |
| CaO | 25.0 to 30.0%, |
| MgO | >8.0 to 10.0%, |
| $B_2O_3$ | 2.5 to 6.0%, |
| $R_2O$ | up to 2.5% |
| $Al_2O_3$ | 0 to 2.0%, | and an $R_2O/B_2O_3$ molar ratio of 0.20 to 0.60.

15 Claims, No Drawings

MINERAL FIBRES

The present invention relates to the field of artificial mineral fibers. It is more particularly targeted at the mineral fibers intended to manufacture thermal insulation materials. It is concerned in particular with vitreous mineral fibers for fire protection applications.

The fire resistance of a structural part corresponds to the period of time during which the part retains its structural function, guaranteeing flame resistance, and retains its thermal insulating role. The standard fire test generally consists of a rise in temperature according to the standard ISO 834, based on the curve of the temperatures of a cellulose fire. In point of fact, this curve is not representative of fires involving hydrocarbons. In order to simulate fires linked to petroleum products, such as those which may take place on offshore platforms, in the petrochemical industry or in road tunnels, it is the hydrocarbon curve described in the standard EN 1363-1 which is applied. It differs from the cellulose curve by a much more sudden increase in temperature and by a higher final temperature.

The objective of the present invention thus consists in providing a composition of vitreous mineral fibers which is based on the $SiO_2$—CaO—MgO—$B_2O_3$ quaternary system, with an improved behavior toward fire.

This composition also has to be able to be fiberized by the processes conventionally used, such as the blast drawing process or the process of fiberizing over rotors. The progression of the fiberizing by these processes is optimal when the molten material has a viscosity at 1.5 poises. Furthermore, the ideal fiberizing temperature at which this viscosity has to be achieved ($T_{fib}\sim T_{log1.5}$) is between 1320 and 1420° C. As the temperature is not perfectly constant over time or perfectly homogeneous during the fiberizing, a sufficient difference is necessary between the fiberizing temperature ($T_{fib}$) and the liquidus temperature ($T_{liq}$) in order to prevent any problem of devitrification during the fiberizing. This difference, known as fiberizing range, has to be at least 30° C.

Furthermore, the biosoluble nature is, as for all artificial mineral fibers, an important criterion for the mineral fibers according to the invention. Mineral fibers have to be able to dissolve rapidly in a physiological medium in order to prevent any potential pathogenic risk related to the possible accumulation of the finest fibers in the body by inhalation. To this end, the composition according to the invention has in particular to satisfy a carcinogenicity index (KI), defined in the technical regulation TRGS 905, of greater than or equal to 40.

Thus, the present invention relates to mineral fibers exhibiting a chemical composition comprising the following constituents, as percentages by weight:

| | |
|---|---|
| $SiO_2$ | 57.0 to 60.0% |
| CaO | 25.0 to 30.0% |
| MgO | >8.0 to 10.0% |
| $B_2O_3$ | 2.5 to 6.0% |
| $R_2O$ | up to 2.5% |
| $Al_2O_3$ | 0 to 2.0% | and an $R_2O/B_2O_3$ molar ratio of 0.20 to 0.60.

Throughout the whole of the present text, the contents are expressed as percentages by weight, unless otherwise indicated.

Such compositions make it possible to simultaneously satisfy the desired criteria of biosolubility, of improved fire resistance (in particular hydrocarbon fire resistance) and of processability ($T_{fib}\sim T_{log1.5}$ between 1320 and 1420° C. and $T_{fib}-T_{liq}$ of greater than 30° C.). These properties have in particular been able to be obtained by virtue of the combination of a relatively high magnesia content (greater than 8.0%), of the presence of boron oxide and of a very specific $R_2O/B_2O_3$ molar ratio.

The mineral fibers according to the invention are vitreous fibers, that is to say that they exhibit a predominant (at least 50%) vitreous phase, generally at more than 90%, indeed even at more than 99%, by weight, or even at 100%, in contrast to ceramic fibers, which are crystalline. The proportion of vitreous and crystalline phases in the mineral fibers can be determined by X-ray diffractometry (XRD).

The compositions of mineral fibers according to the invention are based on the $SiO_2$—CaO—MgO—$B_2O_3$ quaternary system, that is to say that the sum of the contents of $SiO_2$, CaO, MgO and $B_2O_3$ represents at least 92%, in particular at least 95%, of the composition. Preferably, the sum of the contents of $SiO_2$, CaO, MgO, $B_2O_3$ and $R_2O$ represents at least 95%, in particular at least 97%, indeed even at least 98%, of the composition of mineral fibers.

The silica ($SiO_2$) content is within a range extending from 57.0 to 60.0%, in particular from 57.5 to 59.5%. A content of greater than 60.0% can decrease the biosolubility of the mineral fibers. A content of less than 57.0% can unfavorably affect the viscosity of the composition at the fiberizing temperatures.

The lime (CaO) content is within a range extending from 25.0 to 30.0%, in particular from 26.0 to 29.0%. Contents of less than 25.0% can increase the liquidus temperature.

The magnesia (MgO) content is within a range extending from greater than 8.0 to 10.0%, in particular from 8.1%, indeed even 8.3% or 8.5%, to 10.0%, indeed even 9.5% or 9.3%. Contents of less than or equal to 8.0% can increase the liquidus temperature.

The boron oxide ($B_2O_3$) content is from 2.5 to 6.0%, in particular from 2.5%, indeed even 3.0%, to 5.0%, indeed even 4.5%. Contents of less than 2.0% can decrease the fire resistance of the fibers. Above 6.0%, the viscosity at the fiberizing temperatures may be decreased.

The $CaO/(CaO+B_2O_3)$ molar ratio is preferably from 0.75 to 0.95, in particular from 0.78 to 0.91, in order to lower the liquidus temperature and to further widen the fiberizing range.

The total content of alkali metal oxides ($R_2O$), in particular sodium oxide ($Na_2O$) and potassium oxide ($K_2O$), is within a range extending up to 2.5%. The $Na_2O$ content is advantageously from 0.1 to 2.0%. The $K_2O$ content, for its part, is advantageously at most 1.0%, indeed even 0.5%. The mineral wool preferably does not comprise another alkali metal oxide than $Na_2O$ and $K_2O$. Nevertheless, it can contain small amounts of $Li_2O$, sometimes present as impurities in some starting materials.

The $R_2O/B_2O_3$ molar ratio is from 0.20 to 0.60, preferably from 0.23 to 0.54. Without wishing to be committed to any one theory, it is assumed that, in the range of compositions according to the invention, the boron acts mainly as network former when the $R_2O/B_2O_3$ molar ratio is from 0.20 to 0.60. This has the effect of increasing the viscosity at the fiberizing temperatures of the compositions according to the invention while retaining a significant boron oxide content which improves the fire resistance.

The alumina ($Al_2O_3$) content is less than or equal to 2.0%, in particular less than or equal to 1.5%, for example from 0%, indeed even 0.1%, to 1.0%, indeed even 0.7%. Contents of greater than 2.0% can affect the biosolubility of the fibers.

The composition of mineral fibers according to the invention can also contain $P_2O_5$, in particular at contents which can range up to 3%, indeed even up to 1.2%, in order to increase the biosolubility at neutral pH.

The composition according to the invention can also comprise other elements present in particular as unavoidable impurities. It can comprise titanium oxide ($TiO_2$) at contents within a range extending up to 3%, in particular from 0.1 to 2.0%, indeed even 1.0%. Likewise, iron oxide (expressed in the $Fe_2O_3$ form) can be present at contents within a range extending up to 3%, in particular from 0.1 to 2.0%, indeed even 1.0%.

It is obvious that the different preferred ranges described above can be freely combined with one another, it not being possible for all the different combinations to be listed for the sake of conciseness.

A few preferred combinations are described below.

According to a preferred embodiment, the mineral fibers according to the invention exhibit a chemical composition comprising the following constituents, as percentages by weight:

| | |
|---|---|
| $SiO_2$ | 57.5 to 59.5%, |
| CaO | 26.0 to 29.0%, |
| MgO | 8.1 to 9.5%, |
| $B_2O_3$ | 2.5 to 5.0%, |
| $R_2O$ | up to 2.5% |
| $Al_2O_3$ | 0 to 2.0%, | an $R_2O/B_2O_3$ molar ratio of 0.20 to 0.60, in particular of 0.23 to 0.54, and a $CaO/(CaO+B_2O_3)$ molar ratio of 0.75 to 0.95, in particular of 0.78 to 0.91.

Another subject matter of the invention is a process for obtaining mineral fibers according to the invention, comprising a stage of melting a vitrifiable mixture having substantially the same chemical composition as that of said mineral fibers, and then a stage of fiberizing, in particular by a blast drawing process or a process of fiberizing over rotors.

The melting stage makes it possible to obtain a bath of molten material from a vitrifiable mixture. The vitrifiable mixture comprises various natural and/or artificial starting materials, for example silica sand, phonolite, dolomite, sodium carbonate, and the like.

The melting stage can be carried out in different known ways, in particular by melting in a fuel-fired furnace or by electric melting.

The fuel-fired furnace comprises at least one burner, aerial (the flames are positioned above the bath of molten material and heat it by radiation) or immersed (the flames are created directly within the bath of molten material). The or each burner can be supplied with various fuels, such as natural gas or fuel oil.

"Electric melting" is understood to mean that the vitrifiable mixture is melted by the Joule effect, by means of electrodes immersed in the bath of molten material, with the exclusion of any use of other heating means, such as flames. The vitrifiable mixture is normally distributed homogeneously over the surface of the bath of molten material using a mechanical device and thus constitutes a heat shield which limits the temperature above the bath of molten material, with the result that the presence of a superstructure is not always necessary. The electrodes can be suspended so as to dip into the bath of molten material via the top, be installed in the siege or also be installed in the sidewalls of the tank. The first two options are generally preferred for large-sized tanks, in order to achieve the best possible distribution of the heating of the bath of molten material. The electrodes are preferably made of molybdenum, indeed even optionally of tin oxide. The passage of the electrode made of molybdenum through the siege is preferably carried out via a water-cooled electrode holder made of steel.

The melting stage can also employ both fuel-fired melting and electric melting, for example by employing a fuel-fired furnace also provided with electrodes in the sidewalls used to accelerate the melting of the vitrifiable mixture.

The fiberizing stage is preferably carried out by the blast drawing process or the process of fiberizing over rotors. The blast drawing process, described, for example, in CA 1 281 188, consists in conveying the molten material through one or more nozzles in order to form a primary filament. The primary filaments are subsequently attenuated using a high-speed gas stream in order to obtain the mineral fibers.

The process of fiberizing over rotors, also known as cascade fiberizing and described, for example, in WO 92/06047, consists in pouring the molten material over an assembly of rotors fitted in rotation around different substantially horizontal axes. The rotors are arranged so that, when they are in rotation, the molten material poured over the periphery of the upper rotor of the assembly of rotors it projected onto the periphery of the following rotor, and then successively onto the periphery of each following rotor. The mineral fibers are projected by centrifugal force from the or each rotor and collected.

The fibers obtained can be bonded together using a sizing composition sprayed at their surface, before being received and shaped to give various mineral wool products, such as rolls or panels. The mineral wool products thus bonded preferably comprise at most 10% by dry weight of binder, with respect to the total of the weight of the binder and of the mineral fibers.

In order to obtain an even better thermal resistance, the mineral wool advantageously comprises a phosphorus compound, preferably sprayed at the same time as the sizing composition. The phosphorus compound can be inorganic, such as described in the application WO 01/68546, or partly organic, for example an oligomer or polymer of the poly (phosphonic or phosphoric acid or ester) type, as taught by the application WO 2006/103375.

Another subject matter of the invention is a thermal insulation product comprising mineral fibers according to the invention. Such a product is provided in particular in the form of rolls or panels. It can be employed, for example, in buildings, in industry or in means of transportation, in particular rail or shipping. It is particularly suitable for applications in which it may be caused to be subjected to high temperatures, either continuously (insulation of domestic or industrial ovens or stoves, or pipes for the transportation of fluids) or accidentally, in a protective role against fire (fire doors, insulation of boats, tunnels or offshore platforms, and the like). More generally, the product according to the invention can be employed for thermally insulating buildings, tertiary buildings or living quarters (communal or individual), of any type. It can, for example, be used in systems for insulating via the outside, for the insulation of wooden-framed houses, in sandwich panels, in ventilation ducts, and the like.

The examples which follow nonlimitingly illustrate the invention.

Examples of glasses (example 1 according to the invention and comparative examples 2 to 5), the compositions by weight of which are presented in table 1, were prepared.

The fiberizing range corresponds to the difference between the fiberizing temperature, at which the composition has to exhibit a viscosity of approximately 1.5 poises, and the liquidus temperature ($T_{fib}$-$T_{liq}$~$T_{log1.5}$-$T_{liq}$).

The sagging is determined by thermomechanical analysis. The glasses obtained are reduced to glass powder, the particle size of which is less than 40 μm. Each glass powder is compacted in the form of cylindrical pellets with a diameter of 5 mm and a height of approximately 1 cm and with a density equal to 64% of that of the glass. The sagging, expressed as percentage, corresponds to the variation in the height of a glass powder pellet subjected to a gradient of 10 K/min from ambient temperature up to 1100° C., with respect to the initial height of the pellet. The measurement of height of the sample is carried out using a probe positioned at the top of the cylinder. The repeatability tests make it possible to define a standard deviation of less than 1%.

| Glass | 1 | 2 | 3 | 4 | 5 |
|---|---|---|---|---|---|
| $SiO_2$ | 58.8 | 58.8 | 58.6 | 58.2 | 56.8 |
| CaO | 27.4 | 27.3 | 27.4 | 30.0 | 29.3 |
| MgO | 8.9 | 8.9 | 8.9 | 5.9 | 7.8 |
| $B_2O_3$ | 3.7 | 2.9 | 4.9 | 4.9 | 5.0 |
| $Na_2O$ | 0.9 | 1.9 | 0 | 0.9 | 0.5 |
| $Na_2O/B_2O_3$ | 0.27 | 0.71 | 0 | 0.22 | 0.11 |
| $T_{log1.5}$ (° C.) | 1326 | n.m. | 1332 | 1302 | 1275 |
| Fiberizing range (° C.) | >30 | — | 12 | 12 | >30 |
| Sagging (%) | <5 | 11 | <5 | <5 | <5 | n.m.: not measurable

The composition of example 1 according to the invention simultaneously exhibits a low sagging, indicating a good fire resistance, and also a temperature $T_{log1.5}$ between 1320 and 1420° C. and a fiberizing range of greater than 30° C., which makes possible a fiberizing within this temperature range without risk of denitrification. In contrast, the compositions of comparative examples 2 to 5 do not make it possible to satisfy all of these criteria.

The invention claimed is:

1. Mineral fibers exhibiting a chemical composition comprising the following constituents, as percentages by weight:

| $SiO_2$ | 57.0 to 60.0%, |
|---|---|
| CaO | 25.0 to 30.0%, |
| MgO | >8.0 to 10.0%, |
| $B_2O_3$ | 2.5 to 6.0%, |
| $R_2O$ | up to 2.5%, |
| $Al_2O_3$ | 0 to 2.0%, | and an $R_2O/B_2O_3$ molar ratio of 0.20 to 0.60, wherein $R_2O$ is one or more alkali metal oxides.

2. The mineral fibers as claimed in claim 1, wherein said mineral fibers comprise a content of MgO of 8.1 to 9.5%.

3. The mineral fibers as claimed in claim 1, wherein said mineral fibers comprise a content of MgO of 8.3 to 9.3%.

4. The mineral fibers as claimed in claim 1, wherein said mineral fibers comprise a content of $B_2O_3$ of 2.5 to 5.0%.

5. The mineral fibers as claimed in claim 1, wherein said mineral fibers comprise a content of $B_2O_3$ of 3.0 to 4.5%.

6. The mineral fibers as claimed in claim 1, wherein said mineral fibers comprise a content of $Na_2O$ of 0.1 to 2.0%.

7. The mineral fibers as claimed in claim 1, wherein said mineral fibers comprise a content of $K_2O$ of at most 1.0%.

8. The mineral fibers as claimed in claim 1, wherein said mineral fibers comprise a content of $K_2O$ of at most 0.5%.

9. The mineral fibers as claimed in claim 1, the wherein a sum of the contents of $SiO_2$+CaO+MgO+$B_2O_3$+$R_2O$ represents at least 95%, by weight, of the chemical composition of said mineral fibers.

10. The mineral fibers as claimed in claim 1, wherein a sum of the contents of $SiO_2$+CaO+MgO+$B_2O_3$+$R_2O$ represents at least 98%, by weight, of the chemical composition of said mineral fibers.

11. The mineral fibers as claimed in claim 1, wherein the $R_2O/B_2O_3$ molar ratio is from 0.23 to 0.54.

12. The mineral fibers as claimed in claim 1, wherein the CaO/(CaO+$B_2O_3$) molar ratio is from 0.75 to 0.95.

13. The mineral fibers as claimed in claim 1, wherein the CaO/(CaO+$B_2O_3$) molar ratio is from 0.78 to 0.91.

14. A process for the manufacture of the mineral fibers as claimed in claim 1, comprising:
   melting a vitrifiable mixture suitable for to the chemical composition of said mineral fibers, and then fiberizing stage.

15. A thermal insulation product comprising:
   the mineral fibers as claimed in claim 1.

* * * * *